(12) United States Patent
Ercolano et al.

(10) Patent No.: US 7,300,072 B2
(45) Date of Patent: Nov. 27, 2007

(54) ELEMENT FOR AN ADJUSTABLE STEERING COLUMN

(75) Inventors: Tony Ercolano, Wavignies (FR); Dominique Leserre, Montry (FR)

(73) Assignee: Faurecia Interieur Industrie, Nanterre (FR)

( * ) Notice: Subject to any disclaimer, the term of this patent is extended or adjusted under 35 U.S.C. 154(b) by 448 days.

(21) Appl. No.: 10/487,449

(22) PCT Filed: Aug. 19, 2002

(86) PCT No.: PCT/FR02/02901

§ 371 (c)(1),
(2), (4) Date: Aug. 25, 2004

(87) PCT Pub. No.: WO03/018366

PCT Pub. Date: Mar. 6, 2003

(65) Prior Publication Data

US 2005/0001445 A1    Jan. 6, 2005

(30) Foreign Application Priority Data

Aug. 22, 2001    (FR)    .................. 01 11008

(51) Int. Cl.
  *B62D 1/16*    (2006.01)
(52) U.S. Cl. .................................... 280/779
(58) Field of Classification Search ............... 280/779, 280/775, 771; 296/70, 74; 180/90
  See application file for complete search history.

(56) References Cited

U.S. PATENT DOCUMENTS

| | | | | | |
|---|---|---|---|---|---|
| 4,834,422 | A | * | 5/1989 | Oikawa et al. | ............. 280/751 |
| 5,139,281 | A | * | 8/1992 | Dzioba | ........................ 280/775 |
| 5,477,750 | A | * | 12/1995 | Korzan | ...................... 74/579 R |
| 5,573,273 | A | * | 11/1996 | Ito | ............................... 280/775 |
| 5,700,032 | A | * | 12/1997 | Fukunaga | .................... 280/775 |
| 5,758,920 | A | * | 6/1998 | Stephan | ........................ 296/70 |
| 5,813,288 | A | * | 9/1998 | Simonetti | ..................... 74/492 |
| 6,047,987 | A | * | 4/2000 | Cart | ............................ 280/775 |
| 6,152,489 | A | * | 11/2000 | Hedderly et al. | ............ 280/779 |
| 6,206,120 | B1 | * | 3/2001 | Lykken et al. | ............ 180/89.12 |
| 6,282,978 | B1 | * | 9/2001 | Kurita | .......................... 74/493 |
| 6,692,026 | B2 | * | 2/2004 | Gianaris et al. | ............. 280/779 |
| 6,948,741 | B2 | * | 9/2005 | Manwaring et al. | ......... 280/775 |
| 7,077,431 | B2 | * | 7/2006 | Gayer et al. | ................. 280/775 |
| 7,077,434 | B2 | * | 7/2006 | Lee | ............................ 280/779 |
| 2003/0000330 | A1 | * | 1/2003 | Murakami et al. | ............. 74/492 |
| 2003/0047929 | A1 | * | 3/2003 | Gianaris et al. | ............. 280/779 |

FOREIGN PATENT DOCUMENTS

| | | |
|---|---|---|
| DE | 200 17 192 | 12/2000 |
| EP | 0 753 447 | 1/1997 |
| EP | 0 838 387 | 4/1998 |

* cited by examiner

*Primary Examiner*—Paul N. Dickson
*Assistant Examiner*—Barry Gooden, Jr.
(74) *Attorney, Agent, or Firm*—Young & Thompson

(57) ABSTRACT

The invention concerns a device for masking clearances between an instrument panel (6) and a covering element (2) linked to an adjustable steering column along a longitudinal direction (10) and a transverse direction (12). The device comprises a relatively rigid intermediate element (4) mobile solely along the longitudinal direction relative to the instrument panel, to remain in contact with said instrument panel, while the covering element moves along the longitudinal direction and the transverse direction, such that it slides along the longitudinal direction relative to the covering element.

18 Claims, 8 Drawing Sheets

ELEMENT FOR AN ADJUSTABLE STEERING COLUMN

Figure 1:
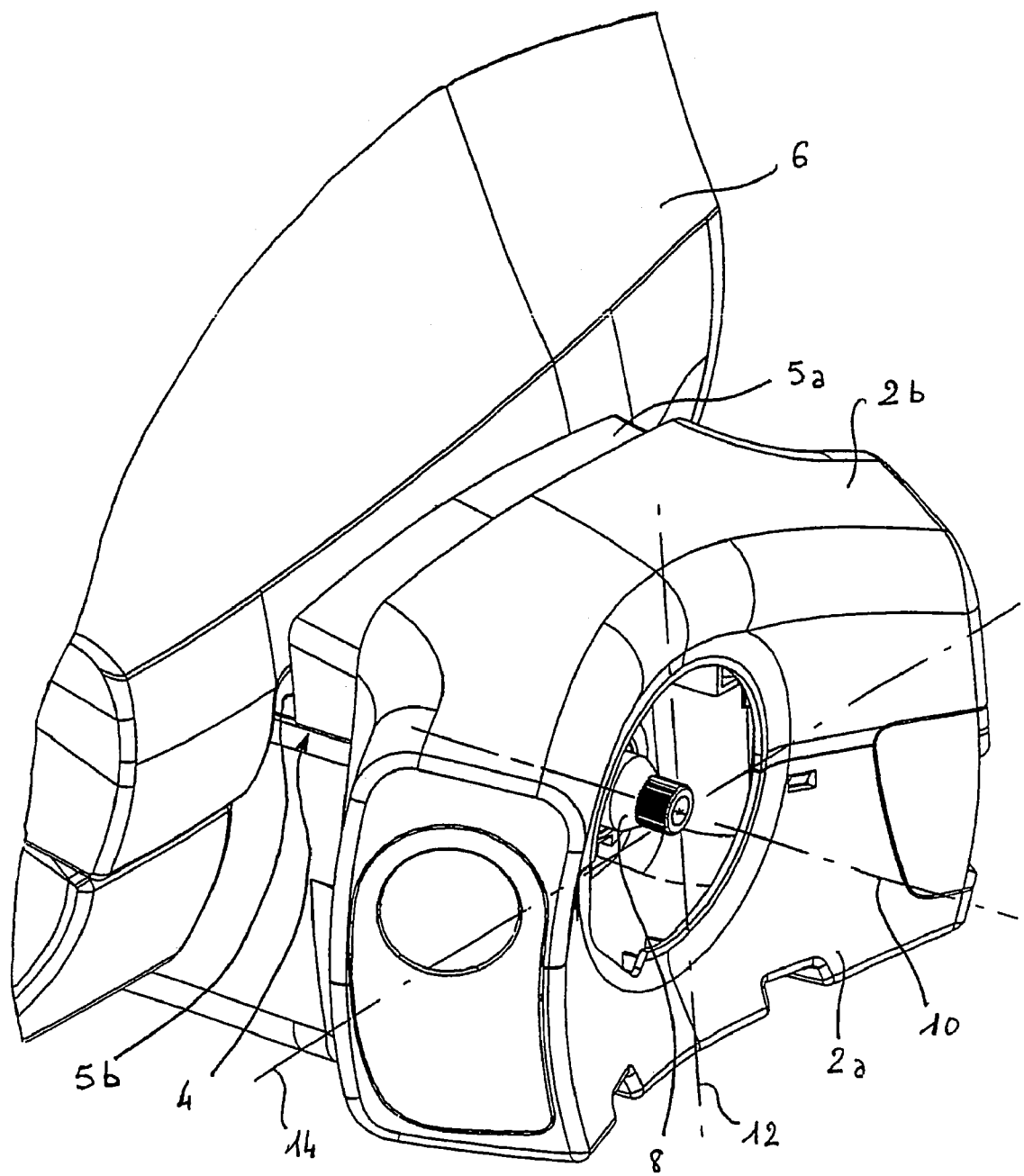

The present invention has for its object a device adapted to cover the gap between a dashboard and a covering element connected to an adjustable steering column.

The invention relates in particular to steering columns movable in two directions and more precisely to steering columns adjustable in translation in a longitudinal direction and angularly in rotation in a lateral direction substantially perpendicular to the longitudinal direction. Said angular rotation of the steering column gives rise to a substantially translatory movement of the covering element relative to the dashboard in a transverse angular direction substantially perpendicular to the longitudinal and lateral direction.

EP-A-0 838 387 discloses a device of this type comprising a relatively rigid intermediate element having a masking surface coming substantially into contact with the dashboard and a sliding surface coming substantially into contact with the covering element. Said intermediate element slides substantially axially relative to the dashboard, whilst the covering element moves in a transverse angular direction relative to the intermediate element.

This arrangement certainly has advantages relative to the prior art. However, it is not completely satisfactory. In particular, it has a consequent size within the general architecture of the dashboard and gives rise to substantial requirements to integrate it harmoniously into the shape of the dashboard.

To solve these various problems, the invention provides that:
the masking surface extends substantially in the longitudinal direction, and the sliding surface extends substantially in the transverse direction,
the device comprises moreover first means to move the covering element substantially in the longitudinal direction relative to the dashboard and to hold the intermediate element in the longitudinal direction relative to the dashboard, during sliding in the longitudinal direction of the steering column relative to the dashboard, such that the sliding surface remains substantially in contact with the dashboard and the covering element slides relative to the masking surface, remaining substantially in contact with said masking surface, and
the device moreover comprises second means to move the intermediate element substantially in the transverse direction relative to the dashboard and to hold the intermediate element in the transverse direction relative to the covering element, during angular rotation of the steering column, such that the masking surface will thus be substantially immovable relative to the covering element and the sliding surface will move substantially in the transverse direction relative to the dashboard, remaining substantially in contact with said dashboard.

Thus, the device is more simple, less cumbersome and of a reduced size.

Preferably, the device moreover comprises means for guiding in translation substantially in the longitudinal direction directly connecting the intermediate element and the covering element.

By directly guiding the intermediate element relative to the covering element, the relative position of these two elements will be better controlled. The meeting between them will thus be more precise, in other words more aesthetically satisfying.

According to another preferred characteristic, the invention provides that the means for guiding in translation comprise:
two grooves extending substantially in the longitudinal direction comprising,
ribs within said grooves, and
first projections extending in the transverse direction and second projections extending in the lateral direction, each of said first and each of said second projections extending between the ribs and the grooves so as to give rise to point contact between the ribs and the grooves.

The guidance is thus simple, less costly and reliable. The point contacts render sliding reliable, by avoiding the phenomenon of wedging, which would be in danger of arising in the case of surface contact between pieces particularly of plastic material.

Figure 2:
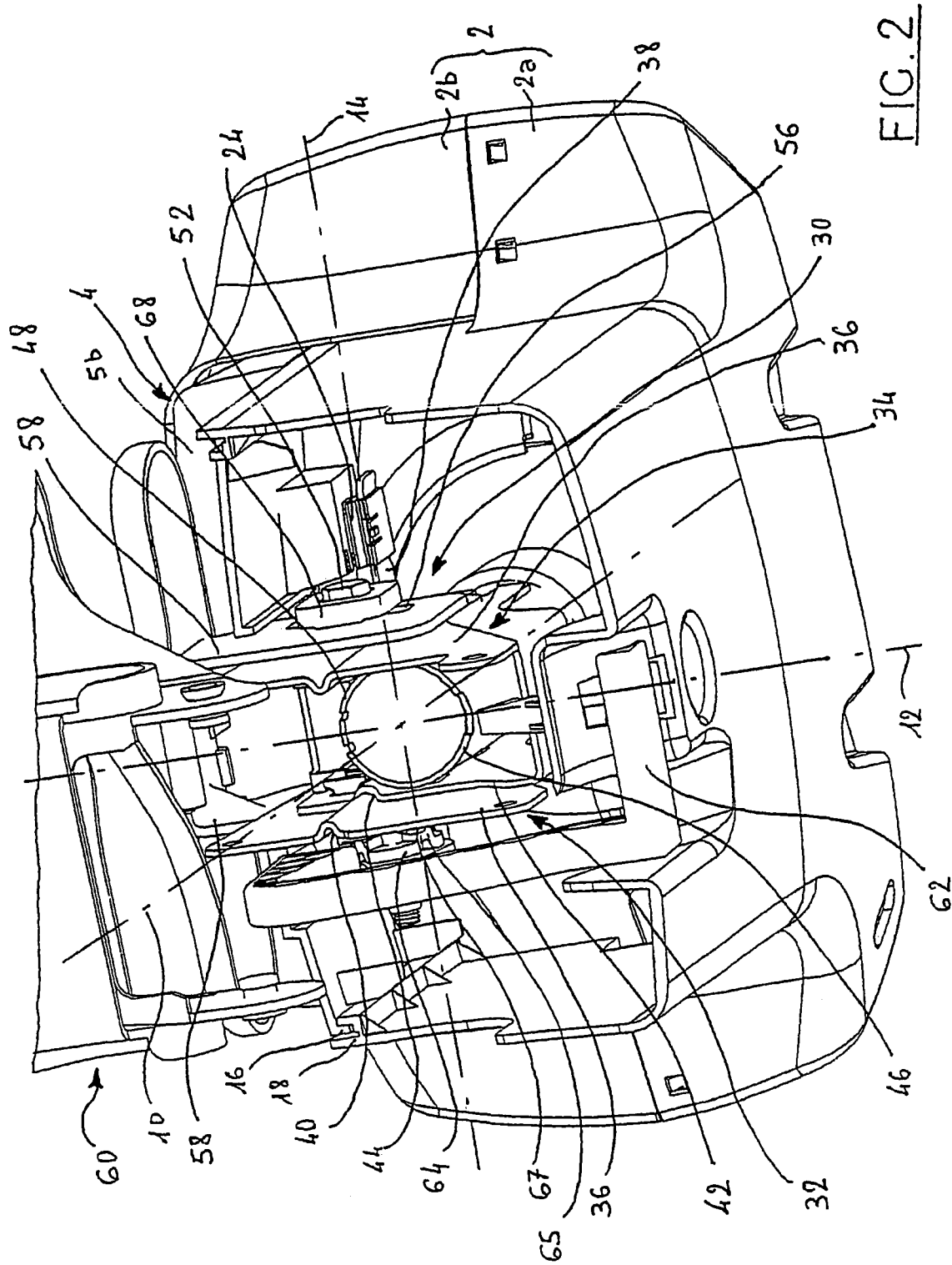
Figure 3:
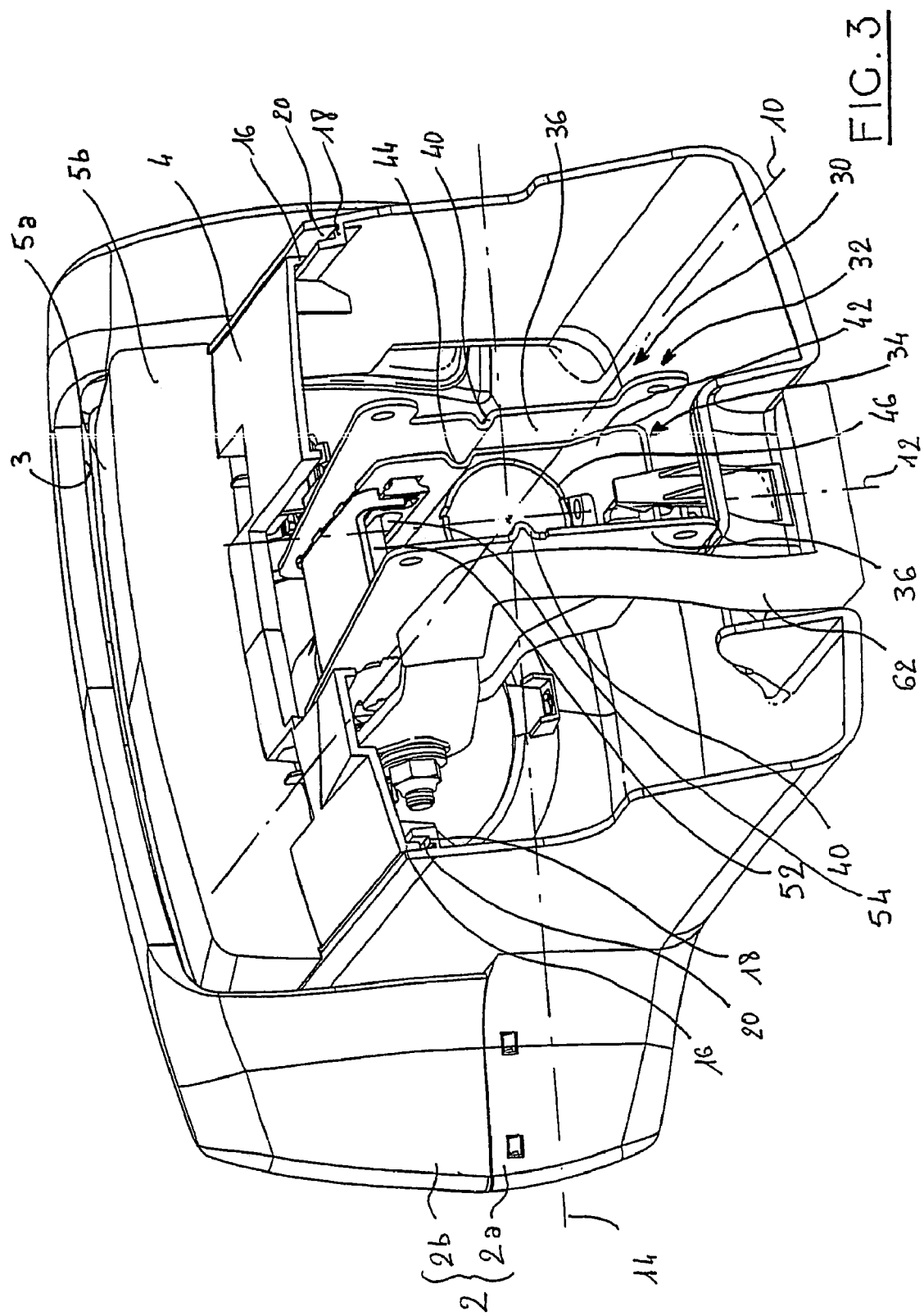
Figure 4:
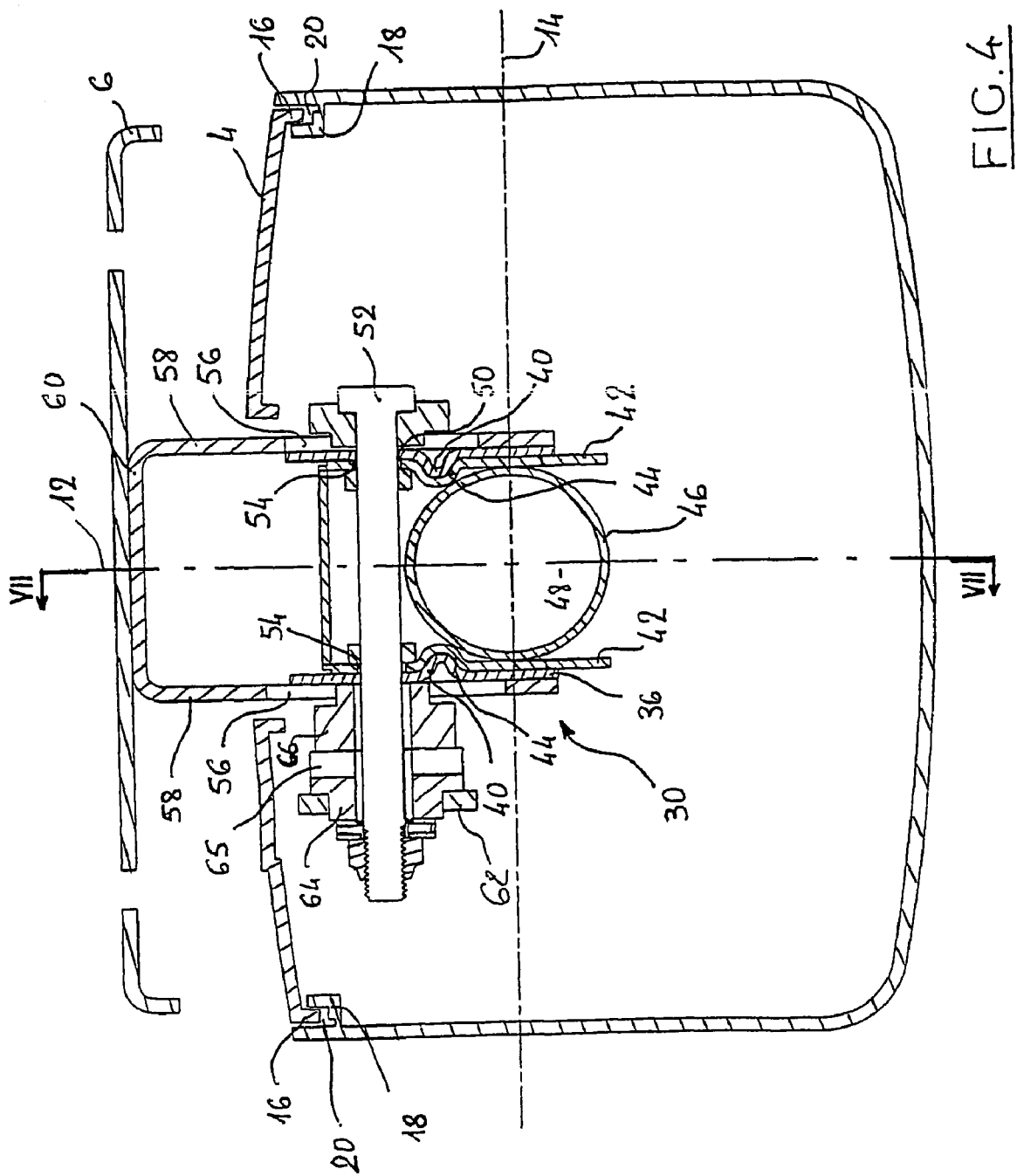
Figure 5:
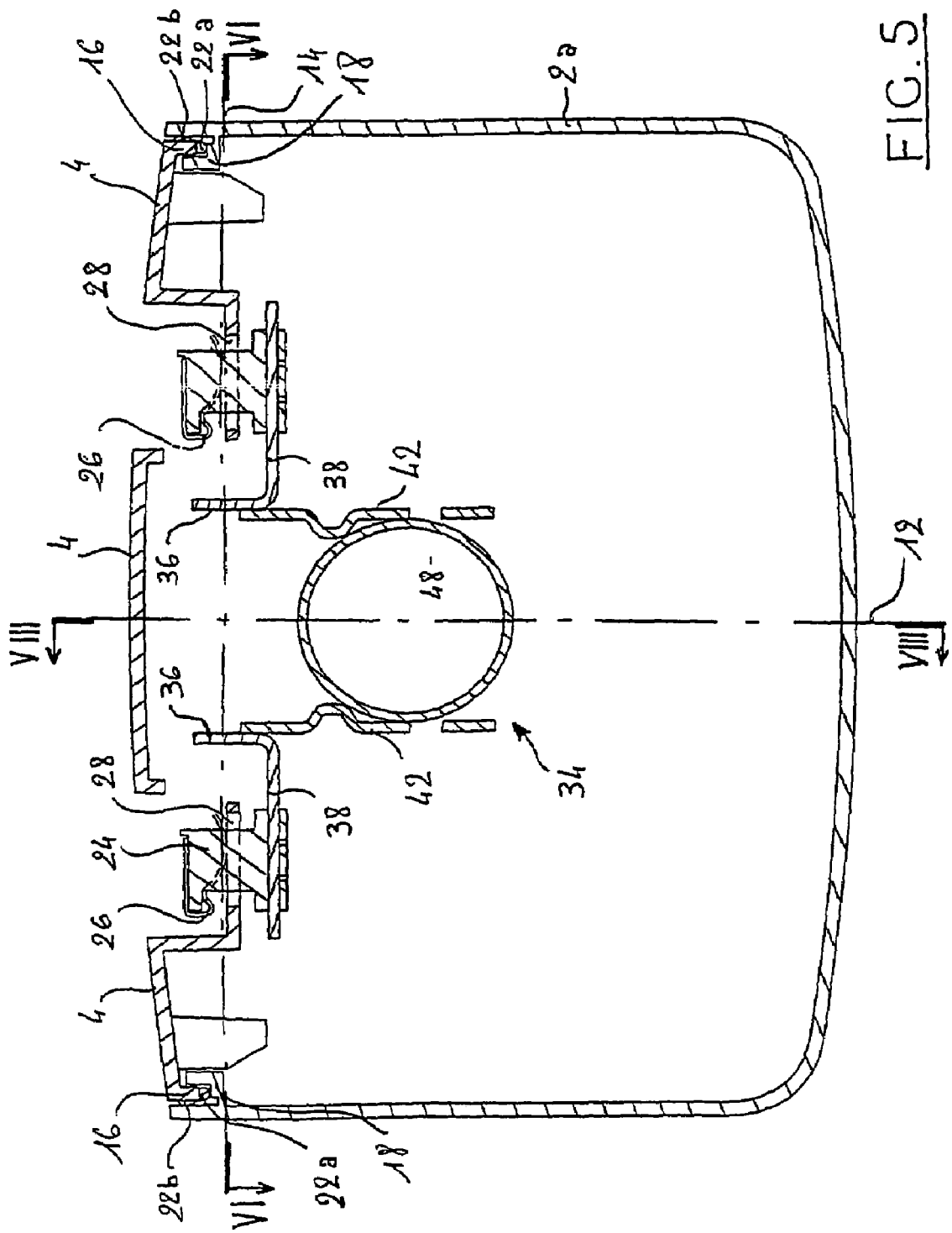
Figure 6:
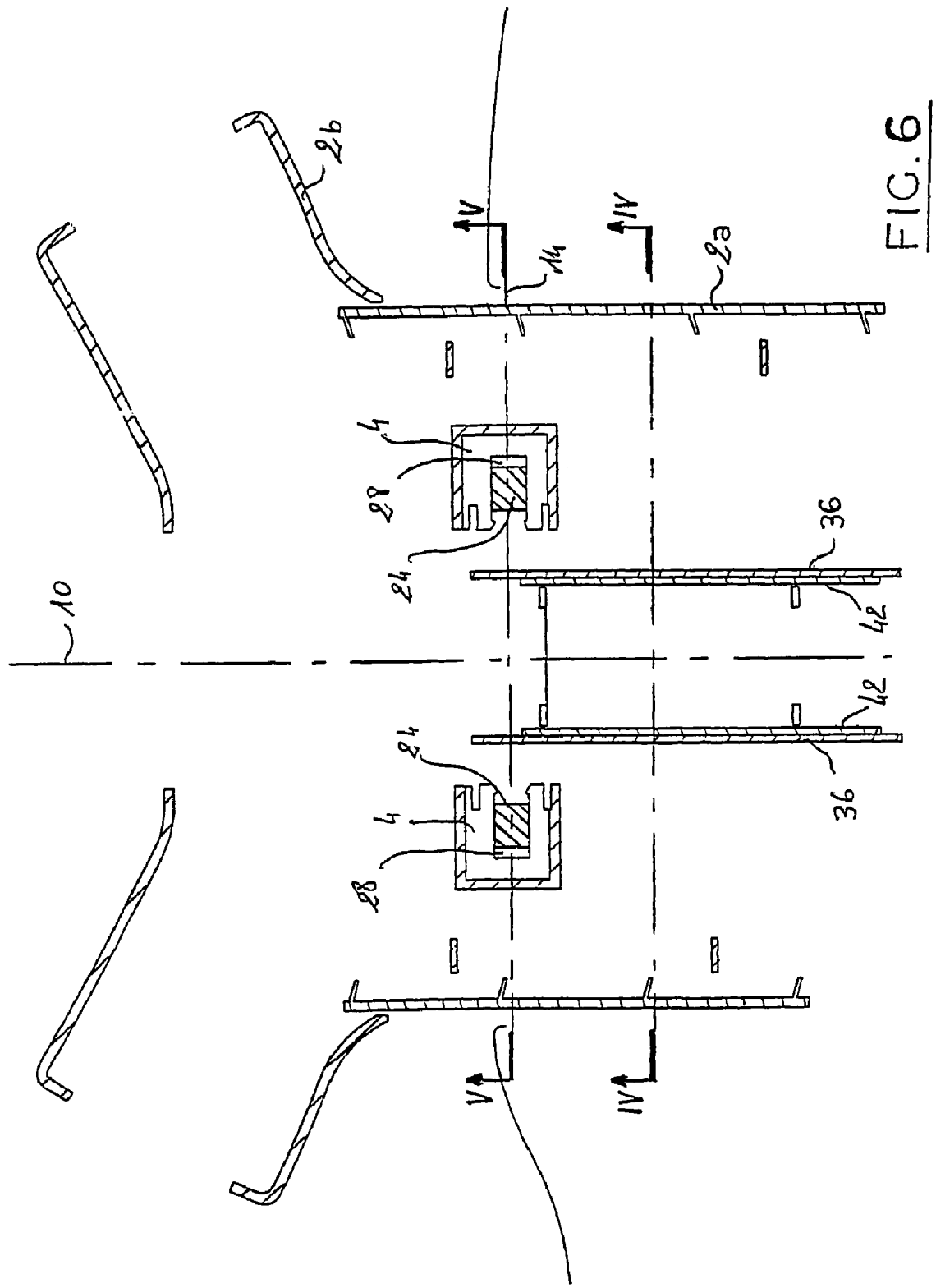
Figure 7:
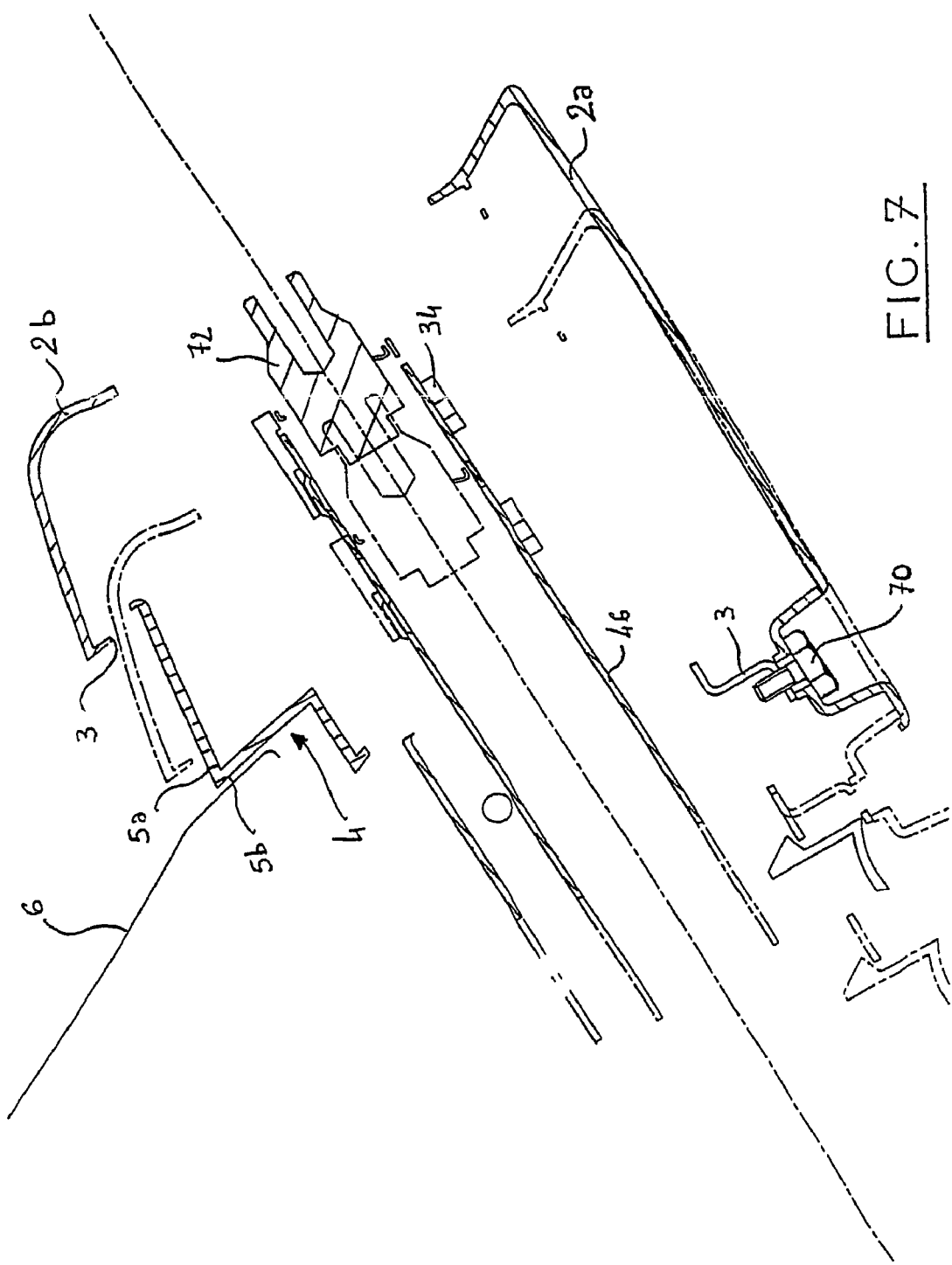
Figure 8:
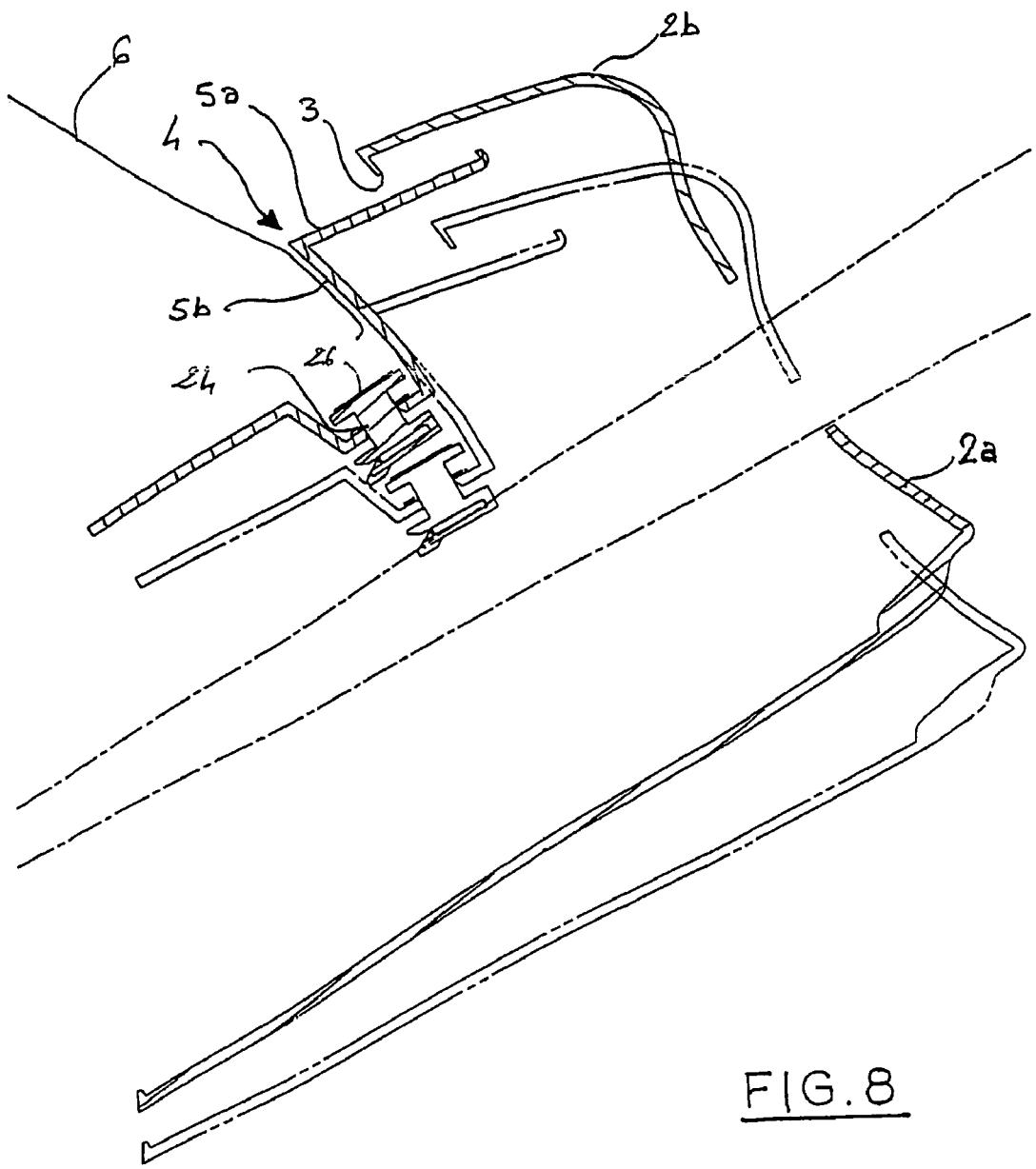

The invention will become more clear from the description which follows, with reference to the accompanying drawings, in which:

FIG. 1 is a top left perspective view of a device according to the invention, within a dashboard, FIG. 2 is a rear perspective right bottom view of the device, FIG. 3 is a rear top perspective left view of the device, without the support fixed to the dashboard, FIG. 4 is a cross-section in the plane IV-IV of FIG. 6, FIG. 5 is a section in the plane V-V of FIG. 6, FIG. 6 is a section in the plane VI-VI of FIG. 5, FIG. 7 is a cross-section in the plane VII-VII of FIG. 4, FIG. 8 is a section in the plane VIII-VIII of FIG. 5.

The figures show a device comprising particularly a covering element 2 and an intermediate element forming a cover 4 disposed between the covering element and a dashboard 6.

The covering element 2 is constituted by a lower half shell 2a and an upper half shell 2b secured together, here by clipping. This covering element is adapted to cover the control casing (not shown) for the signaling means such as the blinkers, the external lights and the windshield wipers, . . . It has a central passage traversed by a steering column shaft 8 adapted to carry a steering wheel and extending in a longitudinal direction 10, in this case substantially horizontally.

The upper shell 2b has a closure surface 3 coming substantially into contact with a masking surface 5a of the cover 4. Said masking surface 5a extends substantially in the longitudinal direction 10 and closes the gap existing between the covering element 2, more precisely the closure surface 3, and the dashboard 6. The cover 4 moreover comprises a sliding surface 5b extending substantially into contact with the dashboard 6 in a transverse angular direction 12, perpendicular to the longitudinal direction 10 and in this case substantially vertical.

As shown particularly in FIGS. 4 and 5, the cover 4 rests on the lower shell 2a. The cover comprises in its lower portion two longitudinal ribs 16 projecting in the direction of the lower half shell 2a and in the transverse direction 12.

The lower half shell 2a has at its upper end two troughs 18 each defining a groove 20 receiving ribs 16 of the cover 4. A principal projection 22a and a lateral projection 22b project relative to each of the ribs 16 at each of their ends in the longitudinal direction and if desired from place to place between these said ends.

The cover 4 accordingly comprises at least four principal projections 22a extending in the transverse direction 12 and four lateral projections 22b extending in a lateral direction 14 which is horizontal and perpendicular both to the longitudinal direction 10 and to the transverse direction 12. These projections 22a, 22b, substantially in the form of spherical cups, each generate a substantially point contact with the trough 18.

The lower half shell 2a and the cover 4 are connected to a structural mechanical assembly 30 comprising a carriage 32, a slide 34 sliding within the carriage 32 in the longitudinal direction 10, an adjustment rod 52 and a control handle 62.

The carriage 32 comprises principally two lateral plates 36 extending perpendicular to the transverse direction 14 and two wings 38 extending in the lateral direction 14, secured to the lateral plates 36. Each of the lateral plates 36 includes an elongated guide rib 40 extending in the longitudinal direction 10.

The slide 34 comprises principally two lateral plates 42 of substantially constant thickness, parallel to each other and held at a distance from each other. They come into contact with the lateral plates 36 of the carriage and each include a rib 44 extending in the longitudinal direction 10 substantially similar to the guide ribs 40, such that said guide ribs 40 of the carriage 32 insert themselves into the ribs 44 of the slide 34 so as to guide it in translation in the longitudinal direction 10.

The slide 34 moreover includes a tubular sleeve 46, secured to the lateral plates 42, defining a passage 48 of circular cross-section passing through the slide in the longitudinal direction 10 and adapted to receive the steering column shaft 8 (shown only in FIG. 1).

The carriage 32 has two circular holes 50 provided in each of the lateral plates 36 and receiving tightly the adjustment rod 52, such that the carriage 32 defines a cover held by the adjustment rod 52. The adjustment rod 52 passes through two oblong holes or slots 54 extending in the longitudinal direction 10 and provided in each of the lateral plates 42 of the slide 34 to permit the slide to move in translation in the longitudinal direction 10.

The adjustment rod 52 also passes through two oblong holes or slots 56 provided in two securement tongues 58 and a support 60 adapted to be fixed to the dashboard 6 or to the structure of a vehicle. The support 60 is accordingly fixed relative to the dashboard. The oblong holes 56 extend in the transverse direction 12 so as to permit the mechanical assembly 30 to slide in said transverse direction 12.

A first ring 64 provided with teeth 65 pivoting about the adjustment rod 52 is fixed to the control handle 62 and coacts with a second ring 66 provided with crenellations 67, which is also traversed by the adjustment rod 52, but stopped in rotation in the lateral direction 14 by the oblong hole 56 into which it is inserted. As a function of the position of the control handle 62, the driver frees or fixes the mechanical assembly 30 relative to the support 60 by pressing a shoe 68 against the securement tongue 58.

As shown in FIG. 7, the lower half shell 2a is fixed to the slide by means of a screw 70.

As shown in FIG. 5, the cover 4 is connected to the wings 38 by claws 24 fixed to the wings 38, hereby clipping, and passing through oblong holes 28 provided in the cover 4. Thus, given the play between the hooks 24 and the holes 28, the cover is free to slide in the transverse direction 12 and the lateral direction 14. On the other hand, the claws 24 are tightly received in the holes 28 in the longitudinal direction 10, such that the position of the cover 4 in said longitudinal direction 10 is predetermined by that of the carriage 32 in this direction, the translatory movements of the carriage 32 and of the cover 4 in this direction being combined.

A resilient tongue 26 held by the hook 24 exerts a pressure in the transverse direction 12 on the cover 4, in the direction of the lower half shell 2a, to hold the cover 4 and in particular its principal projections 22a in contact with the groove 20, including if there exists a slight defect of alignment between the longitudinal direction of the guide rib 40 and the direction of elongation of the rib 20.

When the driver desires to adjust the position of the steering wheel relative to the dashboard 6 in the longitudinal direction 10, after having actuated the control handle 62, he pushes or pulls on the steering wheel in said longitudinal direction. He thus causes a movement of the shaft 8 of the steering column to which is fixed the steering wheel and a result of a coupling member 72, transmitting the movement of translation in the longitudinal direction to the slide 34. FIG. 7 shows in full line the steering device in the advance position into the passenger compartment and in broken line the retracted position.

Because of the connection existing between the carriage 32 and the support 60 by means of the adjustment rod 52, the carriage 32 cannot move in the longitudinal direction 10 relative to the dashboard 6, such that the slide 34 slides within the carriage 32 in the longitudinal direction 10.

The cover 4, in particular the masking surface 5a and its sliding surface 5b, thus remains immobile relative to the dashboard 6, whilst the covering element 2, in particular its closure surface 3, translates in the longitudinal direction 10 relative to the dashboard 6, thus following the same movement as the steering wheel. As shown in FIG. 7, the closure surface 3 of the covering element 2 thus slides in the longitudinal direction 10 relative to the masking surface 5a of the cover 4, whilst remaining substantially in contact therewith. In practice, a gap comprised preferably between 1 and 5 millimeters will be provided between the closure surface 3 and a masking surface 5a.

When the driver desires to adjust the position of the steering wheel relative to the dashboard 6 in the transverse direction 12, he causes the steering wheel to pivot about the lateral direction 14. The center of rotation being at the end of the steering column which is opposite the steering wheel, it is located at a distance from the device (between 40 and 80 centimeters) very much greater than the movement of the device in the transverse direction 12 (between 2 and 8 centimeters). The pivoting of the steering wheel gives rise accordingly substantially to a movement of translation of the slide 34 in the angular direction 12 relative to the dashboard 6. The carriage 32 being unable to move relative to the slide 34 in the transverse direction 12 because of the ribs 40, 44, thus follows the movement imposed by the slide 34.

As a result, as seen in FIG. 8 showing in full line the device, with the steering wheel in the upper position and in broken line the steering wheel in lowered position, the covering element 2 and the cover 4 follow the movement of the steering wheel, such that there is no relative movement between the covering element 2 and the cover 4. Furthermore, the sliding surface 5b moves relative to the dashboard 6 in the angular direction 12. The sliding surface 5b extending in the angular direction 12, it remains substantially in contact with the dashboard 6 in the course of this movement in the transverse direction 12.

The operation of adjusting the steering wheel has been set forth successively in the longitudinal direction 10, and then in the transverse direction 12, for simplicity. But nothing prevents the simultaneous performance of the two adjustments.

The covering element 2 and the cover 4 are preferably made of a relatively rigid plastic material, such as a polyolefin. The structural assembly 30 needing moreover to resist mechanical forces, the parts of the composite will preferably be made of a stronger material, in particular based on metal.

The invention claimed is:

1. Device to mask the gap between a dashboard (6) and a covering element (2) connected to a steering column (8) adjustable in translation in a longitudinal direction (10) and angularly in a transverse direction (12) substantially perpendicular to the longitudinal direction, said angular rotation of the steering column giving rise to a movement substantially in translation of the covering element relative to the dashboard in a transverse direction (12) substantially perpendicular to said longitudinal direction (10) and to the lateral direction (14), said device comprising moreover a rigid intermediate element having a sliding surface (5b) coming substantially into contact with the dashboard and a masking surface (5a) coming substantially into contact with the covering element, characterized in that:
  the masking surface extends substantially in the longitudinal direction and the sliding surface extends substantially in the transverse direction,
  the device moreover comprises first means (24, 34, 38, 54) to move the covering element substantially in the longitudinal direction relative to the dashboard and a hole in the intermediate element in the longitudinal direction relative to the dashboard, during sliding in the longitudinal direction of the steering column relative to the dashboard, such that the sliding surface remains substantially in contact with the dashboard and the covering element slides relative to the masking surface, while remaining substantially in contact with said masking surface, and
  the device moreover comprises second means (32, 40, 44, 56) to move the intermediate element substantially in the transverse direction relative to the dashboard and to hold the intermediate element in the transverse direction relative to the covering element, during angular rotation of the steering column, such that the masking surface will thus be substantially immovable relative to the covering element and the sliding surface will move substantially in the transverse direction relative to the dashboard, while remaining substantially in contact with said dashboard.

2. Device according to claim 1, characterized in that it moreover comprises guide means (16, 18, 20, 22a,22b) in translation substantially in the longitudinal direction directly connecting the intermediate element to the covering element.

3. Device according to claim 2, characterized in that the guide means in translation comprise:
  two grooves (20) extending substantially in the longitudinal direction (10),
  ribs (16) extending into said grooves, and
  first projections (22a) extending in the transverse direction and second projections (22b) extending in the lateral direction (14), each of said first and second projections extending between the grooves and the ribs so as to give rise to point contacts between the ribs and the grooves.

4. Device according to claim 1, characterized in that:
  the second means comprise a carriage (32) sliding in said transverse direction relative to the dashboard,
  the first means comprise:
  a slide (34) to which is fixed the covering element (2), sliding relative to the carriage in the longitudinal direction, and means (24, 38) to connect in translation the carriage to the intermediate element.

5. Device according to claim 4, characterized in that the intermediate element is moveable relative to the carriage (32).

6. Device according to claim 5, characterized in that it moreover comprises resilient means (26) acting to hold the intermediate element into contact with the covering element (2).

7. Device according to claim 4, characterized in that the intermediate element is moveable relative to the carriage (32).

8. Device according to claim 4, characterized in that:
  the second means comprises a first pair of slots (56) extending in the transverse direction (12), provided in a support (60) fixed to the dashboard (6),
  the first means comprise moreover a second pair of slots (54) extending in the longitudinal direction (10), provided in the slide (34),
  the carriage (32) having two holes (50) supporting a rod (52) passing through the first and second pairs of slots.

9. Device according to claim 4, characterized in that the slide (34) is traversed from side to side in the longitudinal direction (10) by a passage (48) of circular cross-section adapted to receive a steering shaft (8).

10. Device according to claim 5, characterized in that the intermediate element is moveable relative to the carriage (32).

11. Device according to claim 6, characterized in that the intermediate element is moveable relative to the carriage (32) in the lateral direction (14).

12. Device according to claim 5, characterized in that:
  the second means comprises a first pair of slots (56) extending in the transverse direction (12), provided in a support (60) fixed to the dashboard (6),
  the first means comprise moreover a second pair of slots (54) extending in the longitudinal direction (10), provided in the slide (34),
  the carriage (32) having two holes (50) supporting a rod (52) passing through the first and second pairs of slots.

13. Device according to claim 6, characterized in that:
  the second means comprises a first pair of slots (56) extending in the transverse direction (12), provided in a support (60) fixed to the dashboard (6),
  the first means comprise moreover a second pair of slots (54) extending in the longitudinal direction (10), provided in the slide (34),
  the carriage (32) having two holes (50) supporting a rod (52) passing through the first and second pairs of slots.

14. Device according to claim 7, characterized in that:
  the second means comprises a first pair of slots (56) extending in the transverse direction (12), provided in a support (60) fixed to the dashboard (6),
  the first means comprise moreover a second pair of slots (54) extending in the longitudinal direction (10), provided in the slide (34),
  the carriage (32) having two holes (50) supporting a rod (52) passing through the first and second pairs of slots.

15. Device according to claim 5, characterized in that the slide (34) is traversed from side to side in the longitudinal direction (10) by a passage (48) of circular cross-section adapted to receive a steering shaft (8).

16. Device according to claim 6, characterized in that the slide (34) is traversed from side to side in the longitudinal direction (10) by a passage (48) of circular cross-section adapted to receive a steering shaft (8).

17. Device according to claim 7, characterized in that the slide (34) is traversed from side to side in the longitudinal direction (10) by a passage (48) of circular cross-section adapted to receive a steering shaft (8).

18. Device according to claim 8, characterized in that the slide (34) is traversed from side to side in the longitudinal direction (10) by a passage (48) of circular cross-section adapted to receive a steering shaft (8).

* * * * *